Feb. 21, 1967

R. H. ELLIS 3,305,625

HEAT SHRINKABLE SOLDER SLEEVE

Filed Feb. 10, 1966

ROGER H. ELLIS
INVENTOR.

BY Lyon & Lyon
ATTORNEYS

3,305,625
HEAT SHRINKABLE SOLDER SLEEVE
Roger H. Ellis, Atherton, Calif., assignor to Raychem Corporation, Redwood City, Calif., a corporation of California
Filed Feb. 10, 1966, Ser. No. 526,516
7 Claims. (Cl. 174—84)

This invention relates to an electrical connector and more particularly to a solder sleeve which enables proper location of the sleeve with respect to electrical conductors which are to be connected.

Several types of novel electrical connectors are disclosed in Wetmore U.S. patent application Serial No. 211,747, filed July 23, 1962, now Patent No. 3,243,211, the disclosure of which is incorporated herein by reference. The electrical connectors in the Wetmore application include a dimensionally heat unstable member such as a sleeve in which is placed a solder insert. In a typical connector of this type, both ends of the member or sleeve are open to receive the electrical conductors that are to be connected. After insertion of the electrical conductors, the connector is heated causing the member or sleeve to shrink and firmly grip the electrical conductors. The heat also causes the solder to flow and form a soldered connection between the two electrical conductors. The sleeve acts to contain the movement of the solder so that a good soldered joint is assured.

Such members or sleeves in general are made of a material capable of having the property of plastic or elastic memory imparted thereto which are expanded under heat and pressure to a diameter greater than their normal diameter and cooled while kept under pressure. A sleeve treated in this manner will retain its expanded position until it is again heated to above its heat recovery temperature, at which time it will recover its original shape. Examples of materials useful in forming such dimensionally heat unstable recoverable members may be found in Currie Patent 2,027,962 and Cook et al. Patent 3,086,242, the disclosures of which are incorporated herein by reference. Polymeric materials which have been cross-linked by chemical means or by radiation, for example, with high energy electrons or nuclear radiation, such as those disclosed in the Cook et al., patent are preferred for use in the present invention.

A particular area in which recoverable members or sleeves of this type are extremely useful is in the making of insulated soldered connections between electrical conductors, such as between a terminal on a piece of electrical apparatus and a wire, or between two wires. Generally, this is accomplished by providing the recoverable sleeve with an internal ring or ball of solder, passing the electrical conductors into the two ends of the sleeve and heating this assembly so that the sleeve recovers to its original shape and the solder melts and joins the two conductors. The result is a good electrical connection which is insulated and protected by the sleeve as discussed in said Wetmore application.

In some instances the forming of an electrical connection between a terminal, such as a standard connector solder pot, and an electrical conductor is time consuming and requires a relatively high level of skill because the terminal may be of various lengths, and the proper positioning of the sleeve with respect to the terminal and conductor is difficult. It is, of course, desirable that the skill required of an operator making the connection be as low as possible. By providing a predetermined amount of solder in the sleeve, the devices disclosed in the Wetmore application greatly reduced the skill required to make a good connection. However, in view of the aforementioned variation in terminal length, problems can still arise and faulty connections result because of the need to properly locate the terminal, sleeve and conductor and then prevent their relative movement during cooling of the solder.

Accordingly, it is an object of the present invention to provide an improved electrical connector which enables proper location thereof on an electrical conductor.

It is another object of the present invention to provide a solder sleeve which serves to properly locate a terminal and an electrical conductor for a soldering operation.

A further object of the present invention is to provide a solder sleeve having a configuration which enables the proper location of the sleeve with respect to a terminal and a conductor for joining and soldering the terminal and conductor.

An additional object of this invention is to provide a solder sleeve which enables proper positioning of the sleeve and a solder ring within the sleeve onto a solder pot.

It is a further object of this invention to provide a solder sleeve for facilitating connecting a stranded conductor with a solder pot and which guides strands into a restricted diameter which is part of the solder sleeve to keep the strands from extending outside the cup of the solder pot.

These and other objects and advantages of the present invention will become more apparent upon reference to the accompanying description and drawing in which.

The concepts of the present invention are particularly adaptable to solder sleeves employed to terminate and connect a wire having single or multiple strands into a standard connector solder pot. As a result of variations in the length of the solder pot from the body of the connector, it is important that the sleeve have a configuration such that the sleeve and solder ring therein can be readily positioned properly on solder pots of various lengths. Furthermore, it is desirable that the sleeve assist in centering or guiding the wire correctly into the end, or solder cup, of the solder pot, and restrict any loose strand or strands from extending outside the solder cup after the wire has been centered. It also is desirable that the solder completely fill the bottom of the solder cup in order to provide a reliable electrical joint.

In accordance with a preferred embodiment of the present invention, a solder sleeve has a peripheral depression or indentation forming an internal neck intermediate the ends thereof. One side of the neck serves as a step which is positioned against the end of the solder pot to insure proper location of the sleeve on the solder pot, and to properly locate the solder ring at the proper position on the solder pot. Preferably, the internal diameter of the sleeve at the neck is approximately the same as the inside diameter of the solder cup, and the sleeve further includes a tapered portion on the other side of the neck to assist, particularly in the case of stranded wire, in the insertion of the wire into the solder cup. After proper insertion, the application of heat causes the recovery or shrinkage of the sleeve and the fusing of the solder between the solder pot and the wire. The sleeve preferably is of a length to provide both a complete encapsulation of the resulting joint and to provide strain relief for the conductors.

Figure 1:
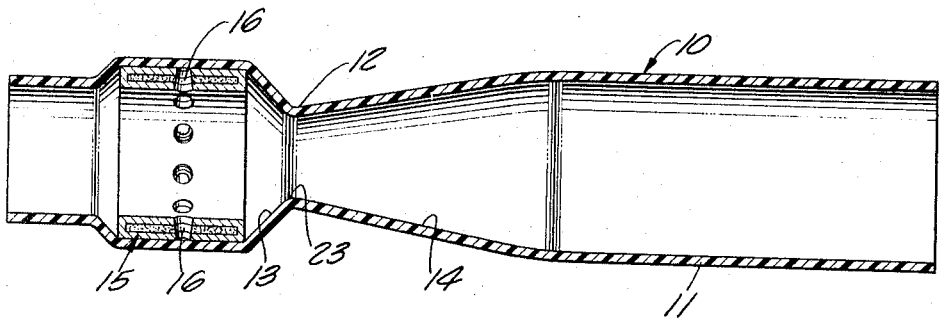
FIGURE 1 is a cross-sectional view of a solder sleeve according to the present invention.

Turning now to the drawing, FIGURE 1 illustrates a solder sleeve 10 in accordance with the present invention. The solder sleeve 10 includes an insulating sleeve 11 which is heat shrinkable, and may be of any suitable material having plastic or elastic memory, these terms being used interchangeably herein. Examples of such materials are described in the aforementioned Currie and Cook et al. patents. Preferably, the sleeve 11 may be formed from radiation cross-linked polyvinylidene fluoride. The sleeve 11 includes an indentation 12 forming a locating step 13 and a frusto-conical tapered portion 14. A solder ring 15 is positioned within the heat recoverable sleeve 11 adjacent to the step 13. The sleeve 11 can be formed into the shape illustrated in FIGURE 1 by preshrinking, or partially shrinking, on suitable mandrels.

The solder ring 15 may be made from a standard round flux cored solder which has been flattened. The flattened solder is formed into a ring and perforated as at 16 to allow the flux to flow at several different points inside and outside the ring during the heating cycle.

Figure 2:
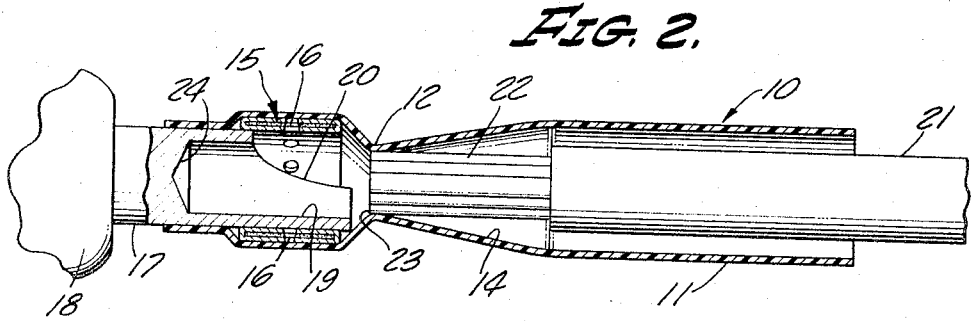
FIGURE 2 is a cross-sectional view of the solder sleeve of FIGURE 1 applied to a terminal.

FIGURE 2 illustrates the manner in which the solder sleeve of the present invention may be properly positioned on a solder pot. The end of the sleeve 10 in which the solder ring 15 is located is positioned on the end of a solder pot 17 extending from a connector body 18. The solder pot includes a bore 19 forming a solder cup, and a mill cut 20 at the end thereof. The solder sleeve 10 is positioned on the solder pot 17 until the end of the solder pot is engaged by the step 13. The sleeve 11 and the solder ring 15 preferably form a tight fit on the solder pot to aid in keeping strands of wire from slipping in between the solder pot and the sleeve during insertion of an insulated conductor 21 having one or more wire strands 22. In order to insure a complete circular fit over the mill cut 20, the solder ring 15 is of a sufficient length to extend beyond the inner termination of the mill cut 20 when the sleeve 10 is positioned on the end of the solder pot 17 as shown in FIGURE 2. The frusto-conical tapered portion 14 of the insulating sleeve 11 terminates at 23 thereby forming an internal neck or guide to assist in gathering the strands of wire of a multi-stranded conductor during insertion of the wire into the end of the solder cup 17. The diameter of the sleeve 11 at the neck 23 preferably is approximately the same as the diameter of the bore 19 in the solder pot 17.

It is desirable that the solder completely fill the bottom 24 of the solder cup 19. The perforations 16 in the solder ring 15 allow the flux to flow at several different points inside and outside the ring during the heating cycle. This allows the inside surface of the solder cup to be fluxed thereby insuring complete solder flow to the bottom 24 of the cup. Additionally, solder normally may form an oxide which leaves a black mark inside the insulating sleeve 11 if the solder ring 15 has not been prefluxed. The perforations 16, which preferably extend through the solder ring and are between approximately five and ten mils in diameter, also enable flux to flow on the outside of the ring 15 during the heating cycle. This allows any oxide that has been formed to go into solution and leave a clear appearance of the sleeve.

Figure 3:
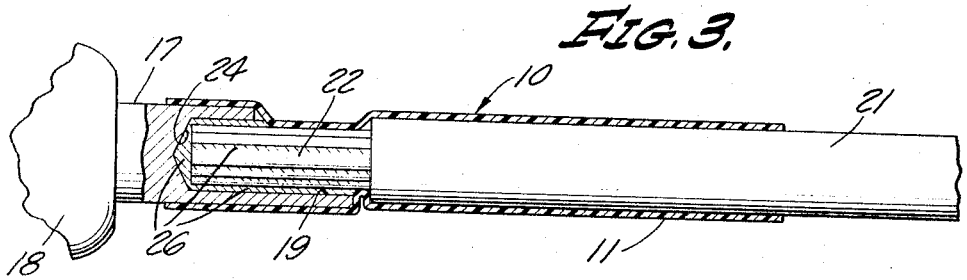
FIGURE 3 is a cross-sectional view of a completed encapsulated connection between the terminal and an electrical conductor.

FIGURE 3 illustrates a completed assembly wherein the insulating sleeve 11 has recovered as shown and the solder ring 15 has melted and flowed as indicated by reference numeral 26 to form a good electrical connection and encapsulation of the joint by the sleeve, as well as to provide strain relief for small size wire at the junction of the wire and the solder cup. In making connections on multiple pin connectors where the spacing between the pins is relatively small, the insulating sleeve 11 also provides insulation over any sharp edges of the connection to reduce the corona effect between adjacent connections.

The indentation in the sleeve described above further provides a locking shoulder in which a a multiple formed strip described in Hess application Serial No. 446,373, filed April 7, 1965, the disclosure of which is incorporated herein by reference, may be used to retain the sleeve for installation of the conductors. This latter application shows various types of electrical connectors made in accordance with the teachings of the Wetmore application and apparatus for simultaneously making a plurality of electrical connections, for example between a plurality of wires and a plurality of terminals.

The present invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A heat recoverable member for facilitating connection with an electrical conductor comprising a heat recoverable sleeve having first and second ends and having an indentation intermediate said ends thereof providing first and second joining tapered portions, said first tapered portion serving to limit the travel of the first end of said sleeve onto an electrical conductor, and a solder insert positioned within said first end of said sleeve and substantially adjacent said first tapered portion.

2. A heat recoverable member for facilitating connection with an electrical conductor comprising a dimensionally heat unstable sleeve having first and second ends and having a peripheral indentation intermediate said ends thereof, said indentation forming an internal step which serves to limit the travel of said first end of said sleeve onto an electrical conductor, and a solder insert positioned within said first end of said sleeve and substantially adjacent said internal step.

3. A member as in claim 2 wherein said solder insert is positioned coaxially within said member and said solder insert includes a plurality of radial perforations therein.

4. A member as in claim 2 wherein said indentation forms a neck with said step being on the side of said neck at said first end of said sleeve, and said neck provides a tapered portion on the other side thereof with said neck and tapered portion serving as a guide for another electrical conductor.

5. An article comprising a sleeve of material which has been dimensionally changed from an original heat stable form to an independently dimensionally heat unstable material capable of moving in the direction of its original form upon the application of heat alone, said sleeve having an indentation intermediate the ends thereof providing first and second joining tapered portions, said first tapered portion serving to limit the travel of said sleeve onto a first electrical conductor, said second tapered portion forming a guide for a second electrical conductor, and a solder insert positioned within said sleeve and substantially adjacent said first tapered portion.

6. An article for facilitating the connection of a wire with the cup of a solder pot comprising an independently dimensionally heat unstable member, said member having first and second ends and having an indentation intermediate the ends thereof forming a neck, said neck providing a step for facilitating the proper positioning of said member on said solder pot and having a tapered portion forming a guide for facilitating insertion of said wire into said cup, and a solder insert positioned within said first end of said member and substantially adjacent said step.

7. An article as in claim 6 wherein said solder insert is positioned coaxially within said member and includes a plurality of radial perforations therein.

References Cited by the Examiner

UNITED STATES PATENTS

| 2,992,457 | 8/1961 | Harrison. | |
|---|---|---|---|
| 3,040,385 | 6/1962 | Folta | 264—342 X |
| 3,143,595 | 8/1964 | Martin | 174—84 |
| 3,239,125 | 3/1966 | Sherlock. | |
| 3,243,211 | 3/1966 | Wetmore. | |

LEWIS H. MYERS, *Primary Examiner.*

LARAMIE E. ASKIN, DARRELL L. CLAY, *Examiners.*